United States Patent
Chen et al.

(10) Patent No.: US 8,352,736 B2
(45) Date of Patent: Jan. 8, 2013

(54) AUTHENTICATION METHOD

(75) Inventors: Liqun Chen, Bristol (GB); Keith Harrison, Chepstow Monmouthshire (GB); Guido Marco Bertoni, Cusano Milanino (IT); Pasqualina Fragneto, Milan (IT); Gerardo Pelosi, Matera (IT)

(73) Assignees: STMicroelectronics S.R.L., Agrate Brianza (Milano) (IT); Hewlett-Packard Development Company, L.P., Houston, TX (US)

( * ) Notice: Subject to any disclaimer, the term of this patent is extended or adjusted under 35 U.S.C. 154(b) by 1334 days.

(21) Appl. No.: 11/315,633

(22) Filed: Dec. 22, 2005

(65) Prior Publication Data

US 2007/0180241 A1 Aug. 2, 2007

(30) Foreign Application Priority Data

Dec. 23, 2004 (WO) .................. PCT/IT2004/000723

(51) Int. Cl.
*G06F 1/02* (2006.01)
*G06F 15/00* (2006.01)

(52) U.S. Cl. .................. 713/168; 708/274; 708/492

(58) Field of Classification Search .................. 713/170, 713/150, 155–156, 168; 726/4, 25; 380/282, 380/285, 255; 705/51; 708/274, 492
See application file for complete search history.

(56) References Cited

U.S. PATENT DOCUMENTS

| | | | |
|---|---|---|---|
| 6,876,745 B1 * | 4/2005 | Kurumatani | 380/28 |
| 2002/0021803 A1 | 2/2002 | Solinas | |
| 2002/0044649 A1 * | 4/2002 | Gallant et al. | 380/30 |
| 2003/0068037 A1 * | 4/2003 | Bertoni et al. | 380/30 |
| 2003/0081785 A1 | 5/2003 | Boneh et al. | |
| 2003/0123668 A1 * | 7/2003 | Lambert et al. | 380/277 |
| 2004/0064700 A1 * | 4/2004 | Kim et al. | 713/170 |
| 2004/0131191 A1 * | 7/2004 | Chen et al. | 380/282 |
| 2006/0253577 A1 * | 11/2006 | Castaldelli et al. | 709/225 |
| 2007/0244944 A1 * | 10/2007 | Bertoni et al. | 708/1 |

FOREIGN PATENT DOCUMENTS

WO WO 03/017559 A2 2/2003

OTHER PUBLICATIONS

Hewlett-Packard Company, Steven D. Galbraith, Keith Harrison, David Soldera-Implementing the Tate Pairing, HPL-2002-23, pp. 2-3.*
EPO Examination Report (May 15, 2007) and European Search Report for EP 05 10 3298 (Jul. 25, 2005).
Shim; "Efficient ID-based authenticated key agreement protocol based on Weil pairing"; Electronics Letters; IEE Stevenage; Apr. 17, 2003; pp. 653-654; vol. 39, No. 8; GB.
Boneh, et al. "Identity-Based Encryption from the Weil Pairing"; SIAM J. of Computing,; 2003; pp. 586-615; vol. 32, No. 3.
McCullagh, et al. "Efficient and Forward-Secure Identity-Based Signcryption"; available on-line at http://eprint.iacr.org/2004/117/, May 2004.

* cited by examiner

*Primary Examiner* — Matthew Smithers
*Assistant Examiner* — Phy Anh Vu
(74) *Attorney, Agent, or Firm* — Hogan Lovells US LLP

(57) ABSTRACT

An authentication method of a first module by a second module includes the steps of generating a first random datum by the second module to be sent to the first module, generating a first number by the first module starting from the first datum and by way of a private key, and generating a second number by the second module to be compared with the first number, so as to authenticate the first module. The step of generating the second number is performed starting from public parameters and is independent of the step of generating the first number.

14 Claims, 2 Drawing Sheets

AUTHENTICATION METHOD

RELATED APPLICATION

The present application claims priority under the Paris Convention of PCT/IT2004/000723 filed Dec. 23, 2004, which is incorporated herein in its entirety by this reference.

FIELD OF THE INVENTION

The present invention relates to an authentication method for authenticating a target module by a verification module.

BACKGROUND OF THE INVENTION

As is known, in the Information Technology field, the demand for safe transmission of messages or information among communicating modules either of the hardware (for example, electronic devices) or software type is always increasing.

To this end, cryptography techniques for outgoing messages have been developed for messages or information to be made unreadable by unauthorized persons.

For safer transmission of information, several cryptography methods provide that one of the modules involved in the communication must authenticate itself to its partner before receiving or transmitting any message. In other words, through an authentication protocol, a target module interacts with a verification module to convince the latter of its identity.

For example, several known authentication methods provide for data exchange between the target module and the verification module. These exchanged data are the result of processing that is carried out by each module in accordance with protocols shared by both modules, though often requiring significant computational resources from both modules, thereby slowing down the authentication operation and requiring a lot of time to complete the operation.

SUMMARY OF THE INVENTION

The object of the present invention is to provide an improved authentication method compared with the known methods.

This object is achieved by a method of authenticating a first module by or with a second module that includes the steps of generating a first random datum by the second module to be sent to the first module, generating a first number by the first module starting from the first datum and by use of a private key ($[s]Q\_A$; $[1/(a+s)]Q_1$), and generating a second number by the second module to be compared with the first number, so as to authenticate the first module. The step of generating the second number is performed starting from public parameters and is independent of the step of generating the first number.

BRIEF DESCRIPTION OF THE DRAWINGS

The characteristics and the advantages of the present invention will be understood from the following detailed description of an exemplary non-limiting embodiment thereof with reference to the annexed FIGS. 1 and 2. In particular, FIG. 1 schematically shows modules involved in carrying out the authentication method of the invention according to protocols of an identity-mapping scheme, such as the scheme proposed by Boneh and Franklin.

DETAILED DESCRIPTION

Figure 1:
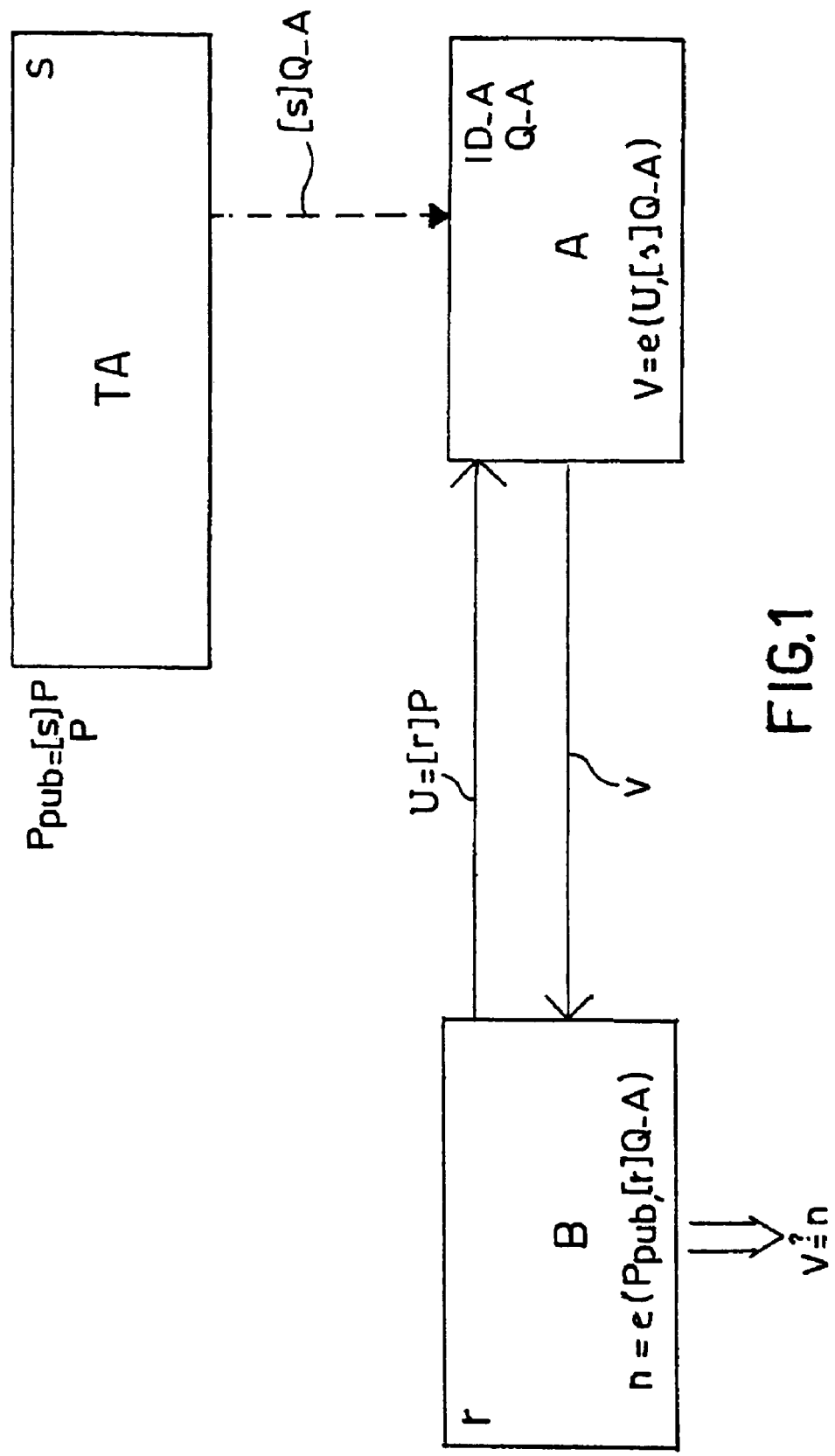
Figure 2:
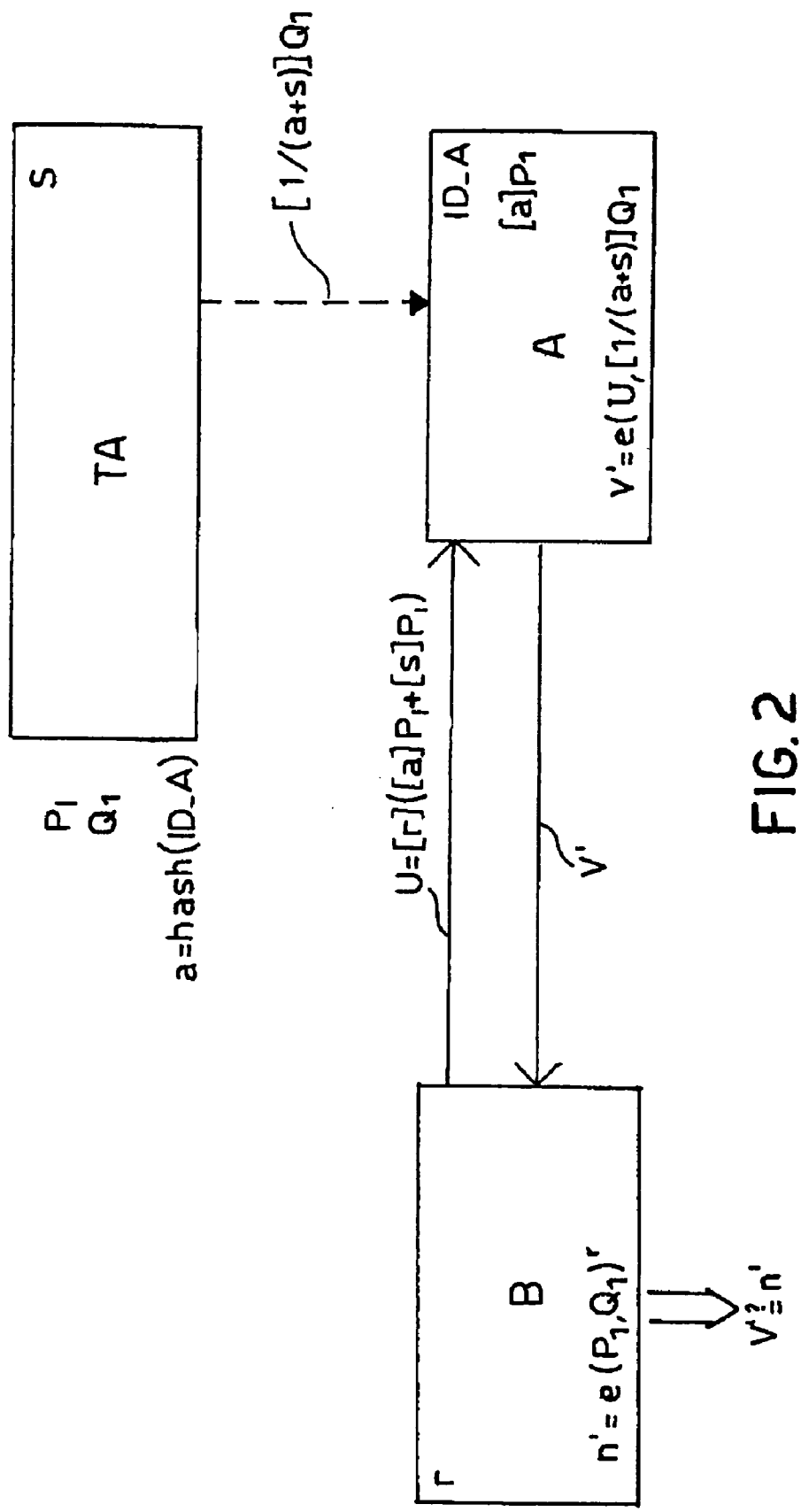
FIG. 2 schematically shows modules involved in carrying out the authentication method of the invention according to an identity-mapping scheme proposed by McCullagh and Barreto.

The authentication methods of FIGS. 1 and 2 provide a processing and exchange of information between a target module or prover A, that wants to authenticate itself, and a verification module or verifier B.

Particularly, the prover A and the verifier B can be either hardware modules, i.e., electronic devices, or software modules, i.e., instruction sequences of a program.

For example, the prover A can be a smart card, a plug-in module for use with a computer (for example, a USB data key for plugging into a USB port of a computer), a computer itself, a mobile telephone (cellular phone) or any device requiring to be authenticated.

The verifier B can be, for example, a cell phone or a set-top-box (for example, a pay-TV decoder) requiring to authenticate the smart card being inserted therein for reading the data of a user. Furthermore, the verifier B can be a computer network server enabled to send information to authorized users' computers, or rather it can be another computer requiring to read the data stored in the USB data key.

Preferably, the authentication methods of FIGS. 1 and 2 are identity-based methods using mathematical schemes known to those skilled in the art. These schemes comprise:

- a finite field or ground field GF(q) (Galois field), i.e., a finite set of elements in which there are defined two operations: addition and multiplication for which the field properties are true;
- an extension field $GF(q^k)$, i.e., a finite field containing the ground field GF(q), where q is a prime power and k is an integer, as is clear for the skilled person.

Additionally, the method refers to three cyclic groups G1, G2 and G3. For example, it is assumed that G1 and G2 are additive groups, whereas G3 is a multiplicative group. Therefore, for the cyclic groups G1 and G2, there can be defined an addition operation (these groups can be designated as (G1, +) and (G2, +)). On the contrary, for the cyclic group G3, there can be defined a multiplication operation (i.e., this group can be designated as (G3, ·)).

For example, G1 and G2 may be the points of an elliptic curve defined on the ground field GF(q) or the extension field $GF(q^k)$, whereas G3 can be a subgroup of $GF(q^k)^*$, i.e., the multiplicative group of the extension field.

In this case, G1 is a [l]-torsion subgroup of the group G2 and satisfies [l]P=O for all P∈G1 where O is the identity element, l is a large prime, and l*cofactor=number of points in G2. Additionally, the value of k is the smallest integer for which $l/(q^k-1)$. Both G1 and G3 are of prime order l.

Furthermore, the described embodiments use a bilinear function e( ) that when applied to elements of the groups G1×G2 gives an element of G3 as a result. For example, this bilinear function may be the Tate pairing, known to those skilled in the art and that can be expressed as:

$$e(.,.) = f(.,.) \exp((q^k-1)/l) \quad (1)$$

wherein f( ) is a generic function. The bilinear function e( ) is a map or pairing having the following properties:

$$e(P+Q,S) = e(P,S) \cdot e(Q,S) \quad (2)$$

$$e(P,R+S) = e(P,R) \cdot e(P,S) \quad (3)$$

$$e([k]P,R) = e(P,R)^k = e(P,[k]R) \quad (4)$$

wherein P and Q∈G1, R and S∈G2. Further, [k]P represents the scalar multiplication of point P by the integer k, so that [k]P=P+P+ . . . +P k times.

It should be observed that Weil pairing may also be used as the bilinear function. In this case, G1 and G2 are the same subgroup of points in the elliptic curve.

The authentication method of FIG. 1 is implemented according to the identity mapping scheme proposed by Boneh and Franklin, an example of which is described in D. Boneh and M. Franklin, *Identity-Based Encryption from the Weil Pairing*, SIAM J. of Computing, Vol. 32, No. 3, pp. 586-615, 2003, which is available on-line and is incorporated herein in its entirety by this reference.

In other words, the prover A can be associated with an identity ID_A, i.e., a bit string identifying said module. In accordance with the mapping method proposed by Boneh and Franklin, a public key Q_A of prover A can be obtained by applying a suitable hash function, called Map-To-Point, to the identity ID_A, that is:

$$Q\_A=\text{Map-To-Point}(ID\_A) \quad (5)$$

It should be observed that the identity ID_A and the public key Q_A of prover A is a kind of information available to anyone, i.e., not confidential information.

Furthermore, the prover A can be associated with a Trusted Authority TA provided with its own secret key s or "master" key. This master key s is also a bit string. Particularly, the Trusted Authority TA applies its own master key s to the public key Q_A in order to generate a private key [s]Q_A for the prover A.

In accordance with FIG. 1, the private key [s]Q_A is supplied by the Trusted Authority TA to the prover A to be stored in a suitable memory of the latter.

Furthermore, with reference to the Trusted Authority TA, there can be defined:
- a base point P with coordinates in the ground field GF(q) and having order equal to the prime l;
- a public point $P_{pub}$=[s]P.

It should be observed that the verifier B that must authenticate the prover A can either have an identity of its own or not. This verifier B knows the public parameter of the prover A, i.e., the identity ID_A, and can compute the public key Q_A through the function hash Map-To-Point, which is a public one. Furthermore, the verifier B knows the mathematic schemes at the heart of the authentication method.

On the contrary, the verifier B does not know the private parameters of the Trusted Authority TA, i.e., the master key s and, accordingly, it does not know the private key [s]Q_A of prover A.

Particularly, the verifier B uses the public parameters and the schemes to generate an authentication protocol of the challenge/response type.

In the first embodiment of the authentication method of the prover A, it is assumed that the verifier B selects a random integer r∈GF(q) and computes a first point U=[r]P to be sent to the prover A. Particularly, the first point U represents the scalar multiplication of point P by the random integer r.

It should be observed that the random integer r is not sent unencrypted to the prover A, but rather it is masked within point U.

In other words, the random number r is confidential information contained in the first point U such as to make secure the verification operation performed by the verifier B. In fact, by knowing the point U and point P one cannot trace the random number r. Therefore, an unauthorized person cannot intrude into the authentication operation by taking the place of verifier B in a fraudulent manner.

This first point U=[r]P is "challenge" information that the verifier B sends to A.

After the first point U=[r]P has been received, the prover A performs a computation involving such point U and its own private key [s]Q_A. Particularly, the prover A computes a first integer v belonging to the group G3:

$$v=e(U,[s]Q\_A) \quad (6)$$

by applying a generic bilinear function e( ) to the first point U and its own private key [s]Q_A. This integer number v is sent to the verifier B.

It should be observed that the verifier B knows the public parameters $P_{pub}$, the identity ID_A (hence, also the public key Q_A=Map-To-Point(ID_A) because the hash function Map-To-Point is public) and the random integer r created by the same.

Therefore, the verifier B can compute a second integer:

$$n=e(P_{pub},[r]Q\_A)=e([s]P,[r]Q\_A) \quad (7)$$

and verify whether it coincides with the first number v that had been sent to it by the prover A.

In other words, the verifier B is capable of establishing the identity of prover A if the latter has properly computed the first number v. In fact, the verification performed by B works because based on (4), (6) can be written as:

$$v = e([r]P, [s]Q\_A) = e(P, Q\_A)^{rs} \quad (8)$$
$$= e([s]P, [r]Q\_A) = e(P_{pub}, [r]Q\_A)$$

Advantageously, the verifier B can compute the second integer n while waiting to receive the first number v from prover A. In fact, the computation of the number n only involves public parameters that are directly available and does not involve information processed by prover A.

In other words, the verifier B can perform the operations simultaneously with the prover A, i.e., both modules can run in parallel with a considerable reduction in the time required for the authentication operation.

It should be observed that a variation of this first embodiment provides that prover A sends a number H1(v) to the verifier B that is obtained by applying a known hash function H1 to the first number v.

This hash function H1 performs an irreversible compression on first number v, i.e., number v cannot be traced by applying the hash function H1 in inverse to number H1(v).

This variation decreases the number of bits exchanged between the prover A and the verifier B while simultaneously increasing the safety of the method. In fact, the first number v, being the pairing information, is not directly available to unauthorized observers of the communication.

In accordance with FIG. 2, a further embodiment of the authentication method of the invention provides the use of an identity-mapping scheme as proposed by McCullagh and Barreto in which the identity is mapped by a hash function to a number which can then be combined with a point by using a scalar multiplication. See a publication to N. McCullagh and P. S. L. M. Barreto, *Efficient and Forward-Secure Identity-Based Signcryption*, available on-line at http://eprint.iacr.org/2004/117/, May 2004, which is incorporated herein in its entirety by this reference.

In this case, the Trusted Authority TA provides, besides the master key s, also first $P_1$ and second $Q_1$ base points having their coordinates in the ground field GF(q). In other words, the base points $P_1$ and $Q_1$ are public parameters that are associated with the Trusted Authority TA, their meaning being understood by those skilled in the art.

Additionally, a further parameter $[s]P_1$ is provided by the Trusted Authority TA as a public parameter.

The prover A is identified by way of its own identity ID_A (a bit string). Furthermore, a further number a can be obtained by said identity ID_A as $$a = \text{hash}(ID\_A) \quad (9)$$

from which it derives that the public key of the prover A relative to the identity is $[a]P_1$.

The Trusted Authority TA supplies the prover A with the public parameters and a private key corresponding to the identity ID_A equal to $[1/(a+s)]Q_1$. This private key $[1/(a+s)]Q_1$ is stored in a suitable memory of the prover A.

In this case, the algorithm of the authentication method provides the steps:

1) the verifier B generates a random integer r and computes the further first point:

$$U=[r]([a]P_1+[s]P_1) \quad (10)$$

to be sent to the prover A;

2) the prover A computes a further first integer v':

$$v'=e(U,[1/(a+s)]Q_1) \quad (11)$$

and sends it to the verifier B;

3) the verifier B verifies that the number v' is equal to a further second number n'

$$n'=e(P_1,Q_1)^r \quad (12)$$

This verification has a positive result in that:

$$\begin{aligned} v' &= e(U, [1/a+s]Q_1) = e([r]([a]P_1+[s]P_1), [1/a+s]Q_1) \\ &= e(P_1, Q_1)^{ra/(a+s)} e(P_1, Q_1)^{rs/(a+s)} = e(P_1, Q_1)^{r(a+s)/(a+s)} \\ &= e(P_1, Q_1)^r = n' \end{aligned} \quad (13)$$

Advantageously, even in this case, the verifier B can compute (12) while waiting for the prover A to compute and send (11).

Furthermore, all modifications and optimizations described for the authentication algorithm mentioned above can be applied to this algorithm.

Obviously, to the authentication method of the present invention, those skilled in the art, aiming at satisfying contingent and specific requirements, may carry out further modifications and variations, all however being contemplated within the scope of protection of the invention, such as defined in the annexed claims.

The invention claimed is:

1. An authentication method of a first module by a second module, the method comprising the steps of:
generating with the second module a random datum;
transmitting the random datum to the first module;
generating with the first module a first number by starting with said random datum and applying a private key associated with the first module through a bilinear function; wherein the bilinear function is a Tate pairing having, substantially, the form:

$$G1 \times G2 \rightarrow G3$$

where
G1 and G2 are additive groups formed by a set of points of an elliptic curve defined over a ground field GF(q) or an extension field $GF(q^k)$ where q is a prime power and k is an integer, and G3 is a subgroup of a multiplicative group of $GF(q^k)^*$, with the group G1 being an [l]-torsion subgroup of G2 such that [l]P=O for all
P ∈ G1 where O is the identity element and k being the smallest integer for which l divides $(q^k-1)$;
and
generating with the second module a second number to be directly compared with said first number to authenticate the first module, wherein
the generating of the second number is carried out starting from public parameters and is performed independent of the generating of said first number, wherein the steps of generating the first and second numbers are performed concurrently, the first module comprises a smart card, a USB data key, a computer or a cell phone, and the second module comprises a cell phone, a set-top-box, a server or a computer.

2. The authentication method according to claim 1, wherein at least one of the public parameters is associated with the first module.

3. The authentication method according to claim 2, wherein said at least one of the public parameters includes a first parameter correlated to a public key of the first module.

4. The authentication method according to claim 3, wherein said public parameters include a second parameter being representative of a public point associated with a trusted authority of the first module.

5. The authentication method according to claim 4, wherein the step of generating the second number by the second module comprises the further step of applying a bilinear function to the first and second parameters.

6. The authentication method according to claim 4, wherein said public parameters include third and fourth parameters representative of public points associated with the trusted authority of the first module.

7. The authentication method according to claim 6, wherein the step of generating the second number by the second module comprises the further step of applying a bilinear function to the third and fourth parameters.

8. The authentication method according to claim 1, wherein said generating a random datum comprises the further steps of:
selecting, by the second module, a random integer; and
computing a scalar multiplication between the selected random integer and a further public parameter to encrypt said random integer.

9. The authentication method according to claim 1, further comprising sending with the first module the first number to the second module.

10. A method of authenticating a first module with a second module, comprising:
generating with the second module a random datum;
transmitting the random datum to the first module;
generating with the first module a first number by starting with said random datum and applying a private key associated with the first module through a bilinear function; wherein the bilinear function is a Tate pairing having, substantially, the form:

$$G1 \times G2 \rightarrow G3$$

where
G1 and G2 are additive groups formed by a set of points of an elliptic curve defined over a ground field GF(q) or an extension field $GF(q^k)$ where q is a prime power and k is an integer, and
G3 is a subgroup of a multiplicative group of $GF(qk)^*$, with the group G1 being an [l]-torsion subgroup of G2 such that [l]P=O for all
P∈ G1 where O is the identity element and k being the smallest integer for which l divides $(q^k-1)$;
and
   at least partially concurrently with the generating of the first number, generating with the second module a second number using public parameters; and
   authenticating the first module by operating the second module to directly compare the second number with the first number, wherein the steps of generating the first and second numbers are performed concurrently, the first module comprises a smart card, a USB data key, a computer or a cell phone, and the second module comprises a cell phone, a set-top-box, a server or a computer.

11. The method of claim 10, wherein at least one of the public parameters is associated with the first module.

12. The method of claim 11, wherein said at least one of the public parameters includes a first parameter correlated to a public key of the first module.

13. The method of claim 12, wherein said public parameters include a second parameter being representative of a public point associated with a trusted authority of the first module.

14. An authentication method of a first module by a second module, comprising:
   generating with the second module a random datum, wherein the generating of the random datum comprises selecting a random integer and computing a scalar multiplication between the selected random integer and a further public parameter to encrypt said random integer;
   transmitting the random datum to the first module;
   generating with the first module a first number by starting with said random datum and applying a private key associated with the first module;
wherein the generating with the first module the first number comprises applying a bilinear function to the random datum and to the private key of the first module and wherein the bilinear function is the Tate pairing having, substantially, the form:

$$G1 \times G2 \rightarrow G3$$

where
   G1 and G2 are additive groups formed by a set of points of an elliptic curve defined over a ground field GF(q) or an extension field $GF(q^k)$ where q is a prime power and k is an integer, and
   G3 is a subgroup of a multiplicative group of $GF(q^k)^*$,
with the group G1 being an [l]-torsion subgroup of G2 such that [l]P=O for all
P∈ G1 where O is the identity element and k being the smallest integer for which l divides $(q^k-1)$;
and
   generating with the second module a second number to be compared with said first number to authenticate the first module, wherein the generating of the second number is carried out starting from public parameters and is performed independent of the generating of said first number, wherein the steps of generating the first and second numbers are performed concurrently, the first module comprises a smart card, a USB data key, a computer or a cell phone, and the second module comprises a cell phone, a set-top-box, a server or a computer.

* * * * *